United States Patent [19]
Kuboji et al.

[11] Patent Number: 5,768,467
[45] Date of Patent: Jun. 16, 1998

[54] CHARACTER DISPLAY CONTROL APPARATUS

[75] Inventors: Genichiro Kuboji, Chiba; Masaru Sato, Tokyo, both of Japan

[73] Assignee: Sony Corporation, Tokyo, Japan

[21] Appl. No.: 899,838

[22] Filed: Jul. 24, 1997

Related U.S. Application Data

[63] Continuation of Ser. No. 537,100, Sep. 29, 1995, abandoned.

[30] Foreign Application Priority Data

Oct. 7, 1994 [JP] Japan .................................. 6-243624

[51] Int. Cl.[6] .................................................. H04N 5/783
[52] U.S. Cl. ............................ 386/68; 386/95; 348/468
[58] Field of Search ........................... 386/1, 39, 95–96, 386/106, 6–8, 68; 348/465, 468, 565, 567, 731; H04N 5/91, 5/76, 5/92, 5/928, 7/04, 7/06, 7/08, 7/52, 5/783

[56] References Cited

U.S. PATENT DOCUMENTS

| | | | |
|---|---|---|---|
| 4,540,851 | 9/1985 | Hashimoto | 179/2 A |
| 4,587,570 | 5/1986 | Chen et al. | 358/907 |
| 4,746,983 | 5/1988 | Hakamada | 358/903 |
| 5,093,726 | 3/1992 | Chun | 348/731 |
| 5,097,348 | 3/1992 | Suetaka | 386/95 |
| 5,170,295 | 12/1992 | Miyahara | 360/27 |
| 5,317,403 | 5/1994 | Keenan | 348/731 |
| 5,371,551 | 12/1994 | Logan et al. | 348/571 |
| 5,398,074 | 3/1995 | Duffield et al. | 348/564 |
| 5,499,103 | 3/1996 | Mankovitz | 360/69 |

*Primary Examiner*—Thai Tran
*Attorney, Agent, or Firm*—Jay H. Maioli

[57] ABSTRACT

A character display control apparatus by which characters displayed in a superposed relationship with an image can be confirmed for a desired time even in a pause mode. A function of a pause button of a remote commander for remotely controlling a VTR is additionally allocated to a pause button of a remote commander for remotely controlling a decoder. When the pause button is manually operated, not only an infrared ray signal for putting the decoder into a pause condition but also an infrared ray signal for putting the VTR into a pause condition simultaneously are outputted. After the decoder is put into a pause condition, a character signal stored in an internal memory of the decoder is repetitively read out and displayed on a monitor. Further, since a signal reproduced from a video tape and outputted from the VTR is a video signal of a same frame, the image displayed on the monitor exhibits a pause condition.

9 Claims, 13 Drawing Sheets

FIG. 19

CHARACTER DISPLAY CONTROL APPARATUS

This is a continuation of application Ser. No. 08/537,100 filed Sept. 29, 1995.

BACKGROUND OF THE INVENTION

1. Field of the Invention

This invention relates to a character display control apparatus suitable for use with, for example, a closed caption decoder.

2. Description of the Related Art

Figure 19:
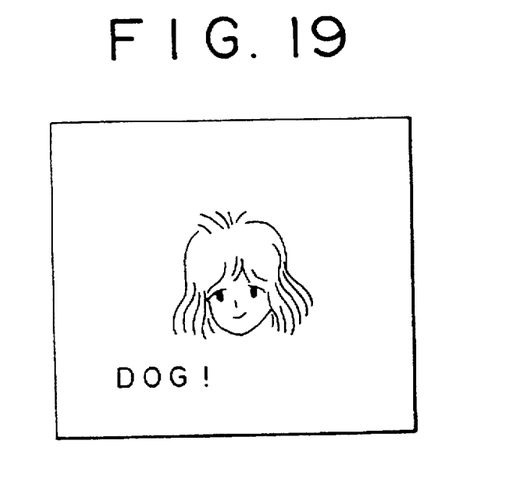
FIG. 19 is a schematic view showing an example of a display by a conventional character display control apparatus.

In a closed caption system, character codes are superposed, for example, on the 21st horizontal scanning line of a video signal. Such character codes are decoded by a decoder to generate corresponding character signals, and the character signals are added to an image signal in the video signal so that characters can be displayed in a superposed relationship to an image as shown, for example, in FIG. 19 (in the example shown in FIG. 19, the characters "DOG!" are displayed).

In Japan, the closed caption system is in most cases utilized to study English. Therefore, a video signal including character codes is recorded on a video tape or a video disk, and the recording medium is reproduced using a video tape recorder (VTR) or a video disk player (LDP). The reproduction output is supplied to and decoded by a decoder, and studying English is performed using the decoder output.

By the way, when a user of a reproduction apparatus such as a video tape recorder or a video disk player listens to, during such studying of English, pronunciation of English and cannot understand it the user wants to put the recording medium into a pause condition to temporarily keep the display of an image and characters in a still condition. In order to realize the pause condition, it is necessary either to put the decoder into a pause condition or to put the reproduction apparatus into a pause condition, or else to put both of the decoder and the reproduction apparatus into a pause condition.

If the reproduction apparatus is left in a reproduction condition while the decoder is in a pause condition, then the image (study program) will proceed while the user tries to confirm the displayed characters, and consequently, the user cannot watch or hear the study program during confirmation of the characters.

On the contrary, if the decoder is left in an operative condition while the reproduction apparatus is in a pause condition, where the decoder is designed so as to meet, for example, the FCC specifications of the United States, a character display is sometimes erased.

In particular, according to the FCC specifications, it is prescribed that, when wrong character data are inputted or when no new character code is inputted for a predetermined period of time (for example, for 16 seconds), characters displayed are then erased. In a pause mode, a signal of a same frame (or field) of a recording medium is reproduced repetitively. Since the reproduction condition in the pause mode is different from the reproduction condition in a standard mode (ordinary reproduction mode), an output video signal reproduced from a recording medium in the pause mode exhibits some disorder compared with that reproduced in the standard mode. As a result, a character code is sometimes taken as a wrong code. If such wrong code is inputted, then according to the FCC specifications, a display of characters then must be erased.

Further, when a frame repetitively reproduced and inputted includes no character code, a display of characters must be erased at a point of time when 16 seconds elapse.

Furthermore, in order to put both of the decoder and the reproduction apparatus into a pause condition, it is necessary, for example, to manually operate a remote commander of the reproduction apparatus to put the reproduction apparatus into a pause condition and manually operate a remote commander of the decoder to put the decoder into a pause condition. In this manner, a manual operation must be performed twice, and accordingly, the operability is low.

Meanwhile, it is also possible to construct the reproduction apparatus and the decoder such that, for example, when one of the reproduction apparatus and the decoder is placed into a pause condition, the other is automatically put into a pause condition. In order to achieve such construction, when one of the two apparatus is put into a pause condition, this must be detected by the other apparatus. To this end, a detection apparatus must be provided in each of the two apparatus, which complicates the construction of each of the reproduction apparatus and the decoder.

SUMMARY OF THE INVENTION

It is an object of the present invention to provide a character display control apparatus by which both displays of characters and an image can be kept in a pause condition for an arbitrary period of time with a simple construction.

In order to attain the object described above, according to an aspect of the present invention, there is provided a character display control apparatus, comprising reproduction means for reproducing and outputting a video signal recorded on a recording medium, composition means for separating character data from the video signal outputted from the reproduction means to produce a character signal, composing the character signal with an image signal in the video signal and outputting a resulted composition signal, and signal generation means manually operated to put the composition means into a pause condition for outputting a first signal to put the composition means into a pause condition and a second signal to put the reproduction means into a pause condition.

The character display control apparatus may be constructed such that the signal generation means is a remote commander for remotely controlling the composition means, and the reproduction means is remotely controllable by a remote commander provided therefor, the remote commander of the composition means including storage means for storing data corresponding to a signal which is outputted from the remote commander of the reproduction means in order to put the reproduction means into a pause condition.

In this instance, the character display control apparatus may be constructed such that the signal generation means includes a manually operable button which is manually operated to put the composition means into a pause condition and also to thereafter cancel the pause condition of the composition means, and the composition means and the reproduction means cancel a pause condition thereof when the manually operable button is manually operated while the composition means and the reproduction means are in the pause condition.

Further, the signal generation means may further include an addition button which is manually operated to store into the storage means data corresponding to a signal to be generated in addition to another signal which is generated originally when the manually operable button is manually operated.

In the character display control apparatus, when the composition means is controlled to be put into a pause condition by the signal generation means, the signal generation means outputs a signal for putting the reproduction means into a pause condition simultaneously. In other words, when a signal for putting the processing to compose an image signal and a character signal into a pause condition is outputted, another signal for putting also the recording medium into a pause condition simultaneously is outputted. Consequently, also in a pause condition, a character display can be confirmed simply with certainty for a desired period of time. Further, the construction to achieve this is not complicated. Besides, such a situation that an image display proceeds forwardly while the user tries to confirm the character display can be prevented.

According to another aspect of the present invention, there is provided a character display control apparatus, comprising means for supplying a video signal including an image signal, an audio signal and character data, a decoder for separating the character data from the video signal, generating a character signal corresponding to the thus separated character data and superposing the character signal and the image signal, means for displaying the thus superposed character signal and image signal, and manually operable means for controlling the decoder so as to allow only the character signal to be displayed and for putting the supplying means into a pause condition.

The character data may be inserted in a vertical fly-back period of the video signal. In this instance, preferably the character data correspond to the audio signal.

The manually operable apparatus may be a remote commander. The remote commander may transmit a control signal to control the decoder to allow only the character signal to be displayed and to put the supply means into a pause condition.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 15 is a flow chart illustrating processing when the pause button of the remote commander of FIG. 3 is turned on;

DESCRIPTION OF THE PREFERRED EMBODIMENT

Figure 1:
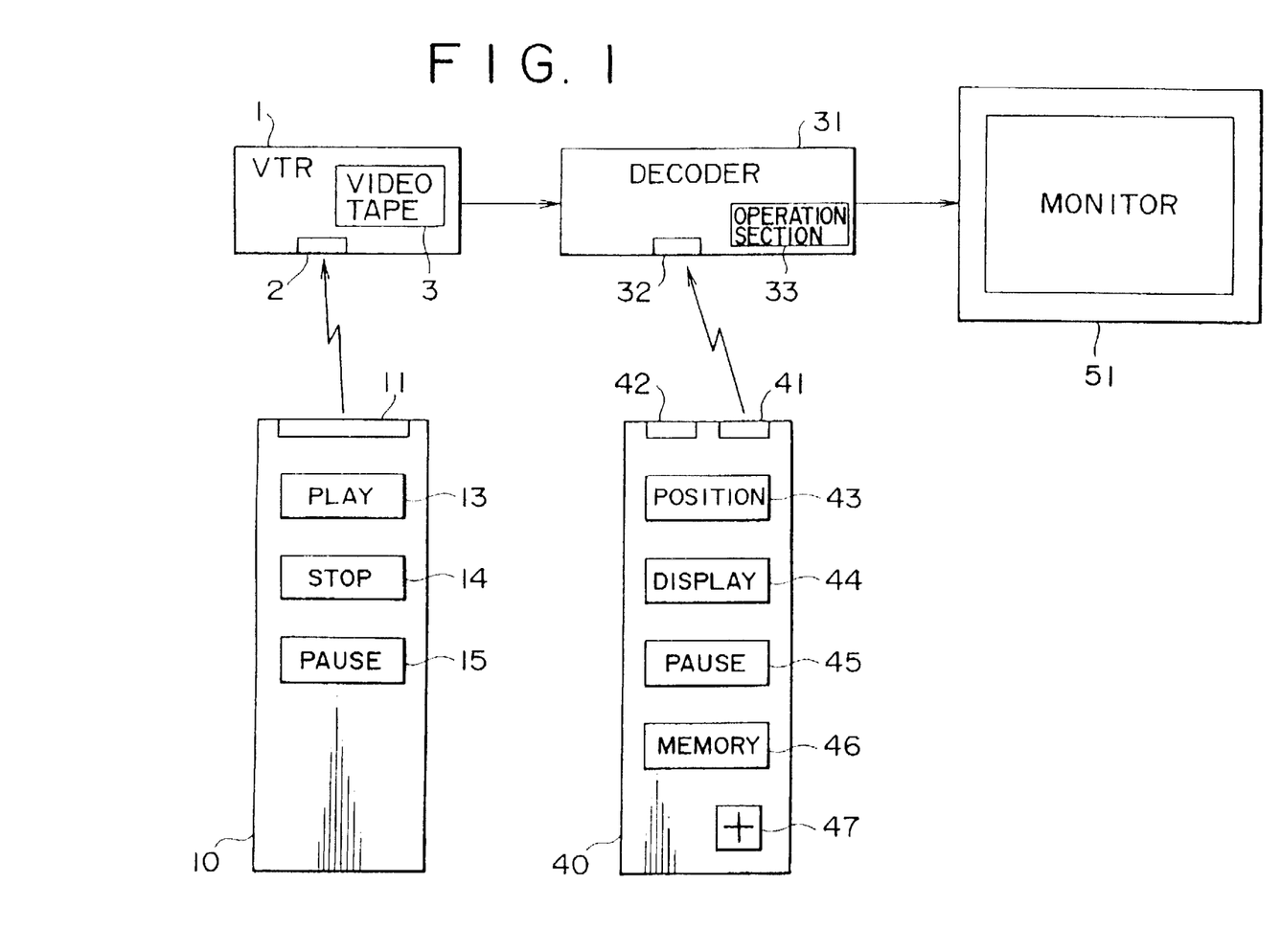
FIG. 1 is a block diagram showing an example of a construction of a closed caption system to which a character display control apparatus of the present invention is applied.

Referring first to FIG. 1, there is shown an example of a construction of a closed caption system to which a character display control apparatus of the present invention is applied. In the closed caption system shown, a video signal recorded on a video tape 3 built in a VTR 1 is reproduced by the VTR 1 and outputted to a decoder 31 by way of an AV signal line. A predetermined instruction can be inputted in the form of an infrared ray signal to the VTR 1 by manually operating a remote commander 10 of the VTR 1. To this end, the remote commander 10 includes a light emission section 11, and the VTR 1 includes a light reception section 2 for receiving an infrared ray signal emitted from the 1VTR 1.

The remote commander 10 includes a play (PLAY) button 13 which is manually operated to instruct reproduction to the VTR 1, a stop (STOP) button 14 which is manually operated to instruct stopping, and a pause (PAUSE) button 15 which is manually operated to instruct a pause.

Meanwhile, the decoder 31 includes a light reception section 32 for receiving an infrared ray signal outputted from a light emission section 41 of a remote commander 40 for the decoder 31, and an operation section 33 which is manually operated to directly input an instruction similar to that which is inputted when a corresponding one of buttons of the remote commander 40 is manually operated.

Meanwhile, the remote commander 40 for remotely controlling the decoder 31 includes a light reception section 42 so that it can receive an infrared ray signal from another remote commander (for example, the remote commander 10). The remote commander 40 further includes a position (POSITION) button 43 which is manually operated to vary the display position of characters, a display (DISPLAY) button 44 which is manually operated to turn on or off a display of characters, and a pause (PAUSE) button 45 which is manually operated to place displayed characters into a pause condition. The remote commander 40 further includes a memory (MEMORY) button 46 which is manually operated to store a function of another remote commander, and an addition (+) button 47.

A monitor 51 receives a video signal outputted from the decoder 31 by way of an AV signal line and displays the thus received video signal.

Figure 2:
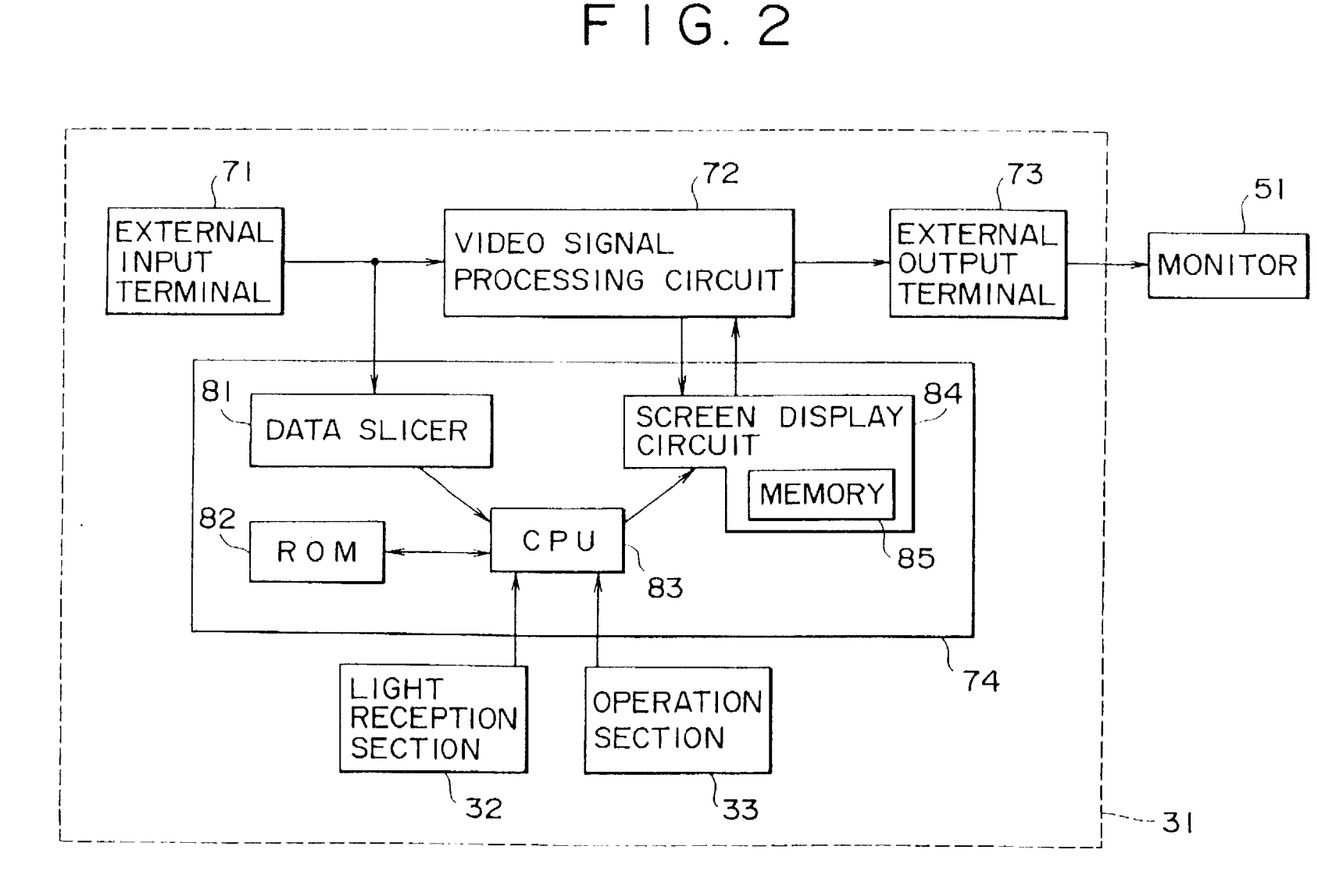
FIG. 2 is a block diagram showing an example of an internal construction of a decoder shown in FIG. 1.

FIG. 2 shows an example of a construction of the decoder 31. For example, the VTR 1 is connected to an external input terminal 71 so that a video signal reproduced by and outputted from the VTR 1 is inputted to the external input terminal 71. The video signal outputted from the external input terminal 71 is inputted to and processed by a video signal processing circuit 72 and then outputted by way of an external output terminal 73 to the monitor 51 connected to the external output terminal 73 so that it is displayed on the monitor 51.

A data slicer 81 of a microcomputer 74 separates character codes included in a 21st horizontal scanning line of a video signal supplied thereto from the external input terminal 71 and outputs the thus separated character codes to a CPU (central processing unit) 83. The CPU 83 decodes the character codes in accordance with a program stored in a ROM (read only memory) 82 and outputs a result of the decoding to a screen display circuit 84. The screen display circuit 84 generates character signals corresponding to an instruction from the CPU 83 and stores them into a memory 85. Then, the screen display circuit 84 counts, with reference to a vertical synchronizing signal inputted thereto from the video signal processing circuit 72, horizontal scanning lines inputted thereto since then, and the character signals stored in the memory 85 are displayed in a superposed condition on predetermined horizontal scanning lines of the image signal in the video signal.

To the CPU 83, a signal received by the light reception section 32 is inputted, and also a signal outputted from the operation section 33 when the operation section 33 is manually operated is inputted.

Figure 3:
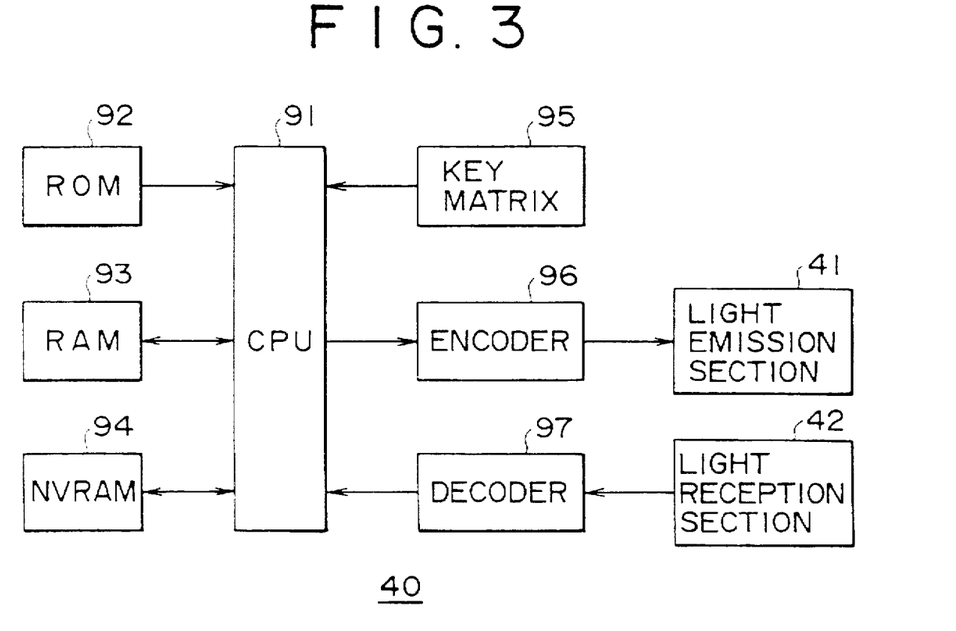
FIG. 3 is a block diagram showing an example of an internal construction of a remote commander shown in FIG. 1.

FIG. 3 shows an example of an internal construction of the remote commander 40. Referring to FIG. 3, a CPU 91 performs various processing in accordance with a program stored in a ROM 92. Data and so forth necessary for the CPU 91 to execute various processing are suitably stored into a RAM (random access memory) 93. Further, data corresponding to a signal outputted when a button is manually operated are stored into an NVRAM (non-volatile memory) 94 formed, for example, from an EEPROM (electrically erasable and programmable ROM) or a backed up RAM.

A key matrix 95 detects a manual operation of any of various buttons including the position button 43 to, the addition button 47 shown in FIG. 1 and outputs a result of the detection to the CPU 91. An encoder 96 encodes a signal inputted thereto from the CPU 91 and outputs the thus encoded signal to the light emission section 41. Further, a decoder 97 decodes a signal supplied thereto from the light reception section 42 and outputs the thus decoded signal to the CPU 91.

Figure 4:
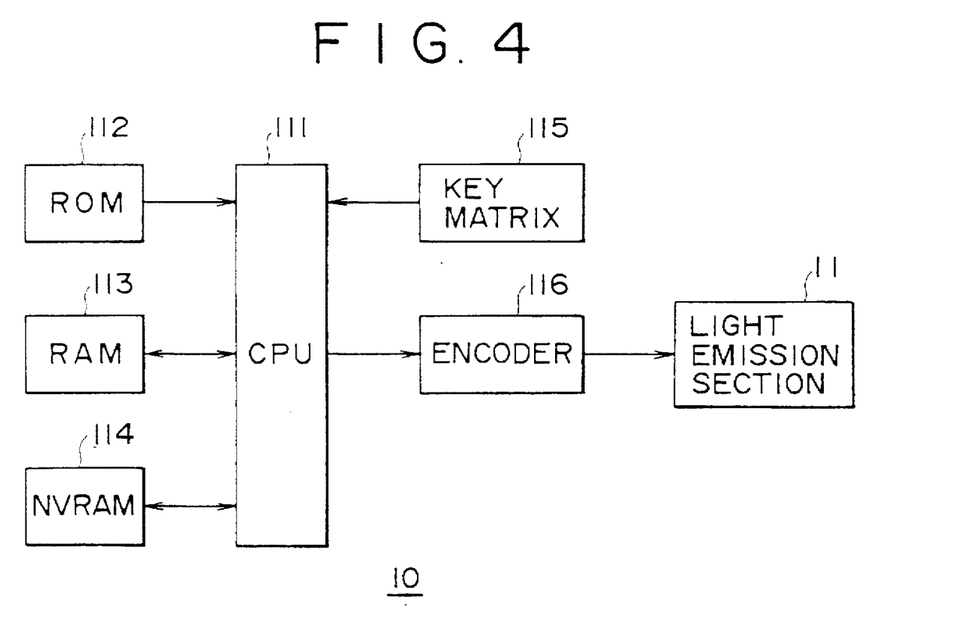
FIG. 4 is a block diagram showing an example of an internal construction of another remote commander shown in FIG. 1.

FIG. 4 shows an example of an internal construction of the remote commander 10. Referring to FIG. 4, also the remote commander 10 has a basically similar construction to that of the remote commander 40 described hereinabove with reference to FIG. 3, and the CPU 91 to encoder 96 shown in FIG. 3 correspond to a CPU 111 to encoder 116 shown in FIG. 4. However, the remote commander 10 does not have components corresponding to the light reception section 42 and the decoder 97 of the remote commander 40.

Figure 5:
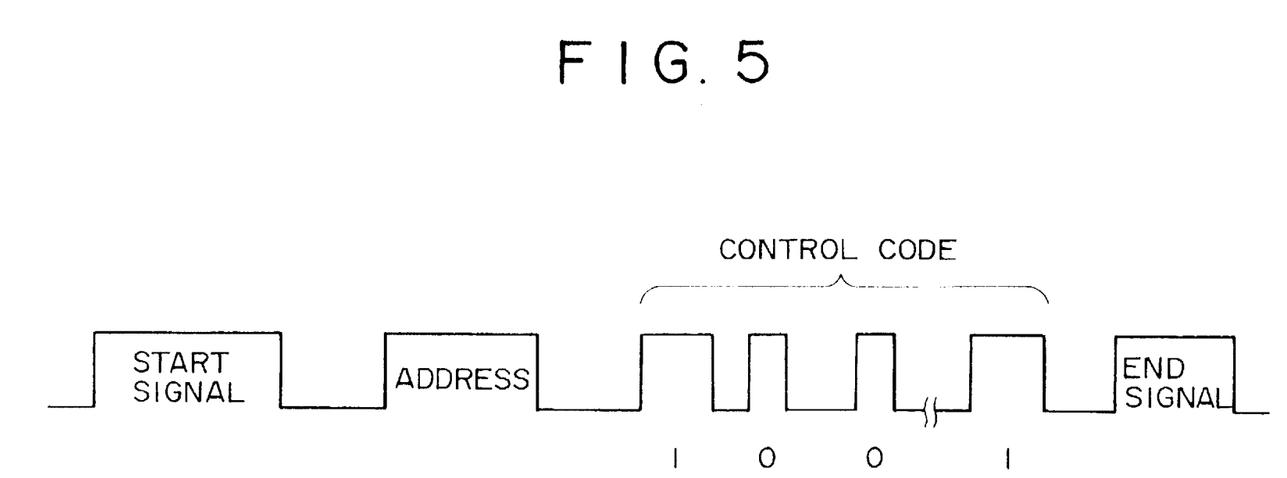
FIG. 5 is a waveform diagram illustrating a format of an infrared ray signal outputted from the remote commanders of FIGS. 3 and 4.

FIG. 5 illustrates a format of an infrared ray signal outputted from the remote commander 40 (similarly also from the remote commander 10). Referring to FIG. 5, a start signal is generated first and then followed by an address (ID) which specifies an apparatus as an object of control (for example, the decoder 31). Subsequent the address, a control code for controlling the apparatus specified by the address is disposed. In the control code, a logic value 1 is represented by a pulse having a greater width while another logic value 0 is represented by a pulse having a smaller width, and one control code is formed from a predetermined number of bits (for example, 16 bits). Further, an end signal is disposed subsequently to the control code.

If the remote commander 40 is manually operated, then an infrared ray signal of the format illustrated in FIG. 5 is outputted from the light emission section 41 to the decoder 31. Similarly, if the remote commander 10 is manually operated, then an infrared ray signal of the format shown in FIG. 5 is outputted from the light emission section 11 to the VTR 1.

Figure 6:
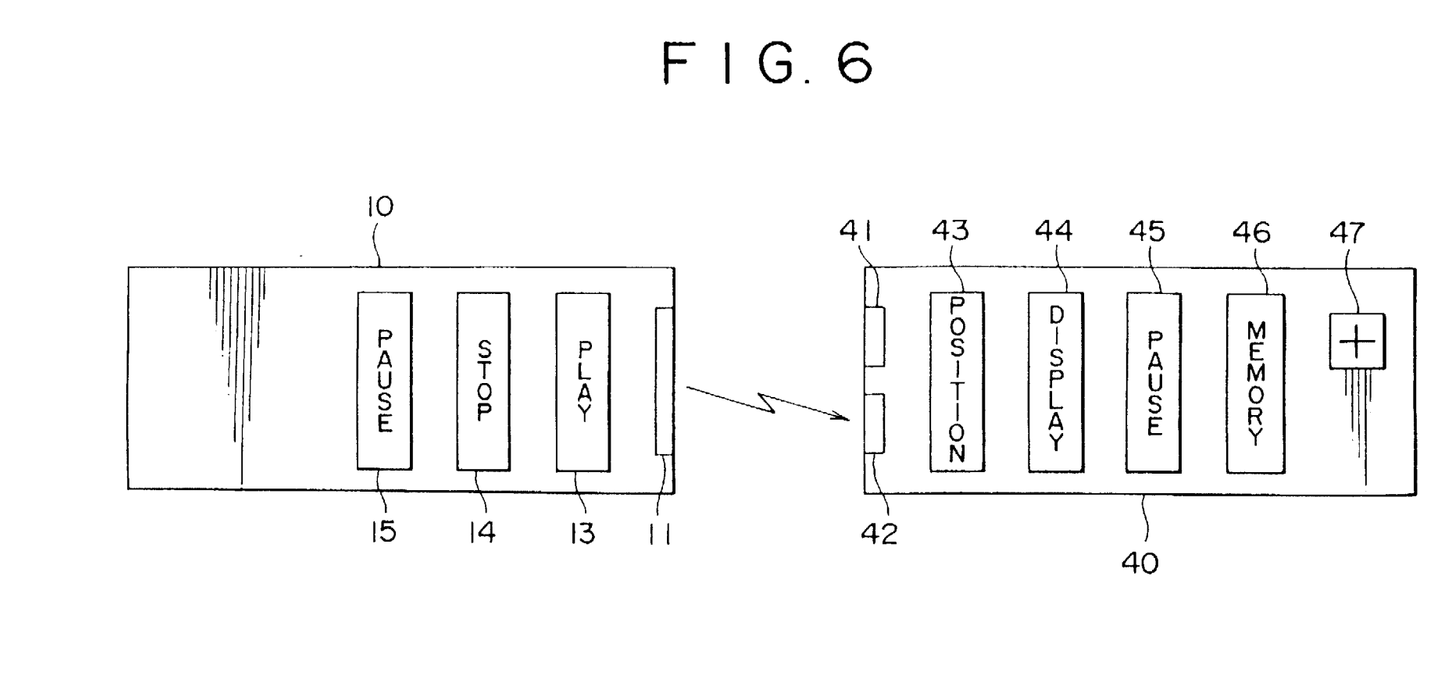
FIG. 6 is a diagrammatic view illustrating a condition of use of the remote commanders of FIGS. 3 and 4 when a function of the remote commander of FIG. 4 is allocated to the remote commander of FIG. 3.

Each of the remote commander 40 and the remote commander 10 outputs an infrared ray signal corresponding to a manually operated one of the buttons provided thereon. However, to a button of the remote commander 40 a function of another remote commander (for example, the remote commander 10) can be allocated. In this instance, the remote commander 40 and the remote commander 10 are disposed in an opposing relationship to each other, for example, as shown in FIG. 6. Where they are disposed in this manner, an infrared ray signal generated from the light emission section 11 of the remote commander 10 is inputted to the light reception section 42 of the remote commander 40.

Subsequently, an example of processing for allocating a function of the remote commander 10 to the remote commander 40 will be described with reference to the flow chart of FIG. 7. The memory button 46 of the remote commander 40 will first be turned on at step S1, and then at step S2, an allocation button of the remote commander 40 itself will be turned on. In order to allocate, for example, a function of the pause button 15 of the remote commander 10 to the pause button 45 of the remote commander 40, the pause button 45 of the remote commander 40 will be turned on.

Then at step S3, an object button (in the present case, the pause button 15) of the remote commander 10 will be turned on. When the pause button 15 of the remote commander 10 is turned on, this is detected by the key matrix 115, and a detection signal is inputted to the CPU 111. In this instance, the CPU 111 controls the encoder 116 so that an infrared ray signal corresponding to the pause button 15 is outputted from the light emission section 11. Consequently, an infrared ray signal having the format illustrated in FIG. 5 is outputted from the light emission section 11 and supplied to the light reception section 42 of the remote commander 40.

The decoder 97 of the remote commander 40 decodes the signal supplied thereto from the light reception section 42 and outputs the thus decoded signal to the CPU 91.

Then at step S4, it is discriminated whether or not the allocation is ordinary allocation. If the allocation is ordinary allocation, then the control sequence advances to step S5, at which the CPU 91 stores the data fetched by way of the decoder 97 as data corresponding to the allocation button (in the present case, the pause button 45) designated at step S2 into the NVRAM 94.

Thereafter, the control sequence advances to step S8, at which the user will manually operate the memory button 46 again. When the CPU 91 detects the manual operation of the memory button 46 by way of the key matrix 95, it ends its memory operation.

On the other hand, when it is discriminated at step S4 that the allocation is not ordinary allocation but additional allocation, the control sequence advances to step S6. At step S6, the user will manually turn on the addition button 47 of the remote commander 40. When the CPU 91 detects the manual operation of the addition button 47 by way of the key matrix 95, it determines that a function of the button of the remote commander 10 acquired at step S3 should be stored not in an ordinary storage mode but in an additional storage mode, whereafter the control sequence advances to step S7, at which additional storage processing is executed. In this instance, the CPU 91 adds the data from the remote commander 10 fetched at step S3, when the pause button 45 designated at step S2 is manually operated, to an original signal corresponding to the manual operation of the pause button 45, and stores the data thus obtained.as data corresponding to a signal to be generated Thereafter, the control sequence advances to step S8, at which the user will turn on the memory button 46 to end the memory processing.

Figure 8:
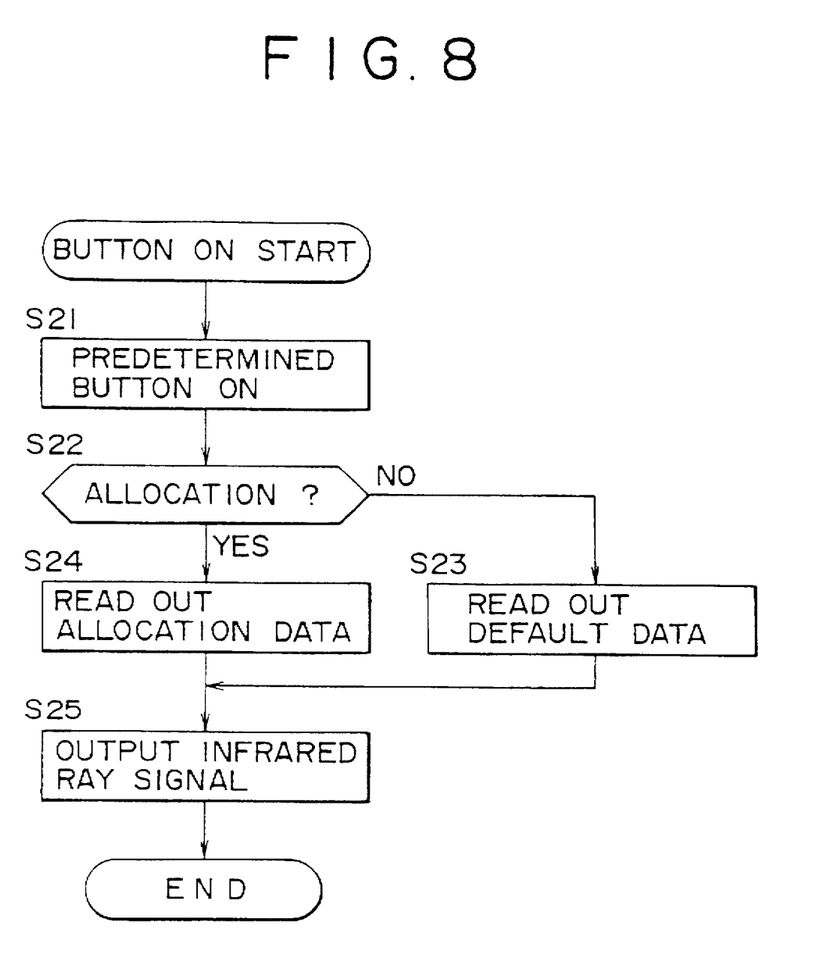
FIG. 8 is a flow chart illustrating processing when a button of the remote commander of FIG. 3 is turned on while the allocation processing illustrated in FIG. 7 is executed.

If a predetermined button of the remote commander 40 is manually operated after such memory processing is performed, then processing illustrated in the flow chart of FIG. 8 is executed. Referring to FIG. 8, if the user turns on a predetermined one of the buttons of the remote commander 40 at step S21, then the CPU 91 detects this by way of the key matrix 95. Then at step S22, it is discriminated whether or not allocation processing corresponding to the thus manually operated button is performed. In particular, it is discriminated whether or not the manually operated button is that one of the buttons designated as the allocation button at step S2 so that a function corresponding to the predetermined button of the different remote commander 10 is allocated to the button.

When the manually operated button is not a button to which the allocation processing has been performed, the control sequence advances to step S23, at which default data corresponding to the button are read out from the NVRAM 94. In other words, when no particular allocation processing has been performed to the button detected at step S21, the CPU 91 reads out data stored as default data corresponding to the button in advance in the NVRAM 94 and outputs the data to the encoder 96.

Figure 9:
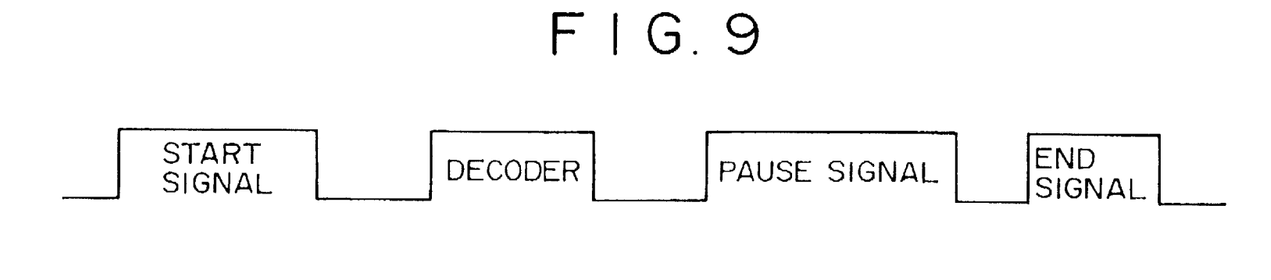
FIG. 9 is a waveform diagram illustrating an output signal when a pause button of the remote commander of FIG. 3 is manually operated while the allocation processing of FIG. 7 is not performed in response to the pause button.

The control sequence thereafter advances to step S25, at which the encoder 96 encodes the thus received data into a signal of the format illustrated in FIG. 5 and outputs the signal to the light emission section 41. Consequently, an infrared ray signal which originally corresponds to the manually operated button is outputted from the light emission section 41. When, for example, the pause button 45 is manually operated, such an infrared ray signal for placing the decoder 31 into a pause condition as illustrated in FIG. 9 is outputted from the light emission section 41.

On the other hand, when it is discriminated at step S22 that allocation processing has been performed corresponding to the button manually operated at step S21, the control sequence advances to step S24, at which processing of reading out the allocation data is executed. In particular, when, for example, the pause button 45 is manually operated, the CPU 91 reads out the data allocated to the pause button 45 from the NVRAM 94 and outputs the thus read out data to the encoder 96. As a result, at step S25, the encoder 96 encodes the received data into a signal of the format illustrated in FIG. 5 and outputs the signal to the light emission section 41. The light emission section 41 outputs an infrared ray signal corresponding to the signal inputted thereto from the encoder 96.

Figure 7:
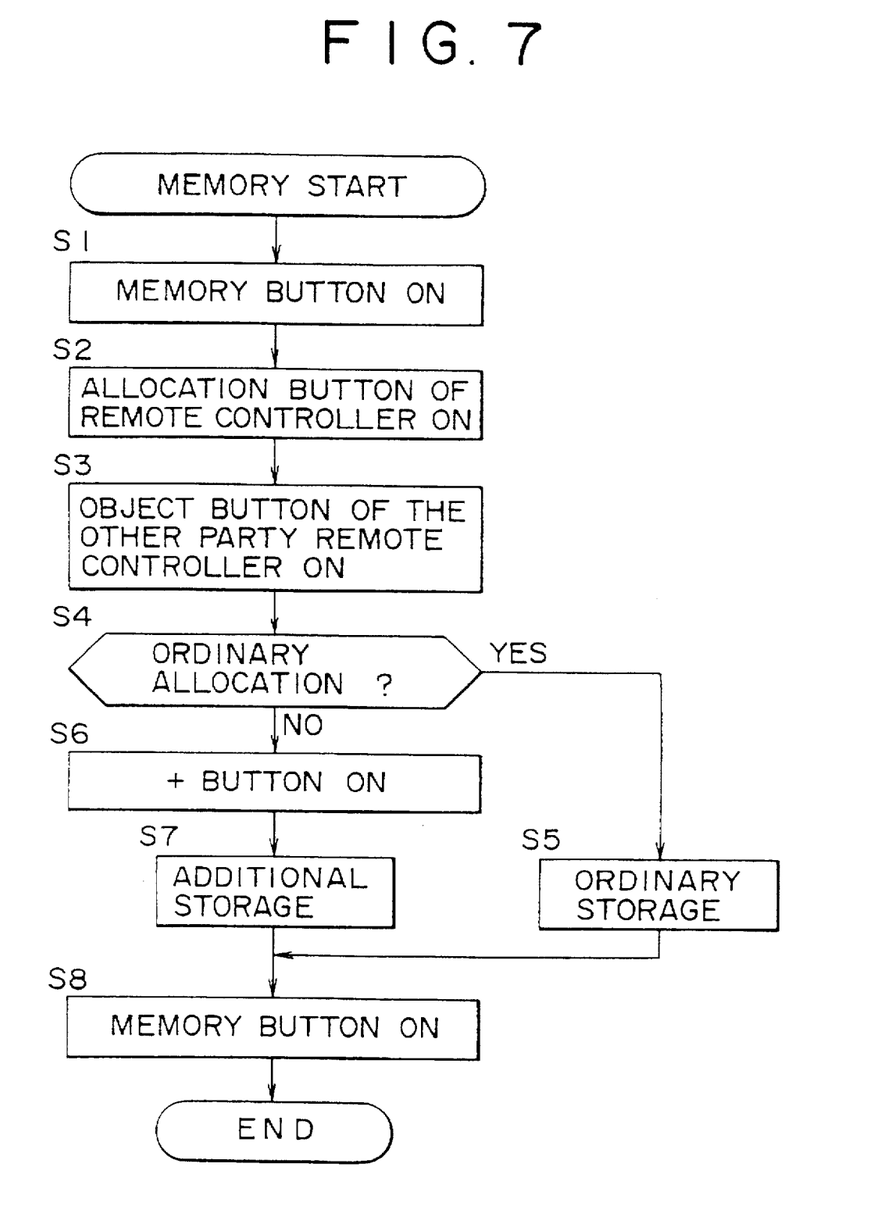
FIG. 7 is a flow chart illustrating processing upon allocation of the function illustrated in FIG. 6.

When the data stored in the NVRAM 94 are ordinary storage data, a signal corresponding to the predetermined button of the remote commander 10 stored ordinarily at step S5 of FIG. 7 is outputted in place of a signal to be outputted originally when the button is manually operated at step S21. In other words, a same infrared ray signal as that when the predetermined button of the remote commander 10 is manually operated is outputted.

On the other hand, when the allocation data have been obtained by the additional storage processing at step S7 of the flow chart of FIG. 7, an infrared ray signal corresponding to the object button of the remote commander 10 designated at step S3 of the flow chart of FIG. 7 is outputted subsequently in addition to an infrared ray signal allocated originally to the button whose manual operation has been detected at step S21.

Figure 10:
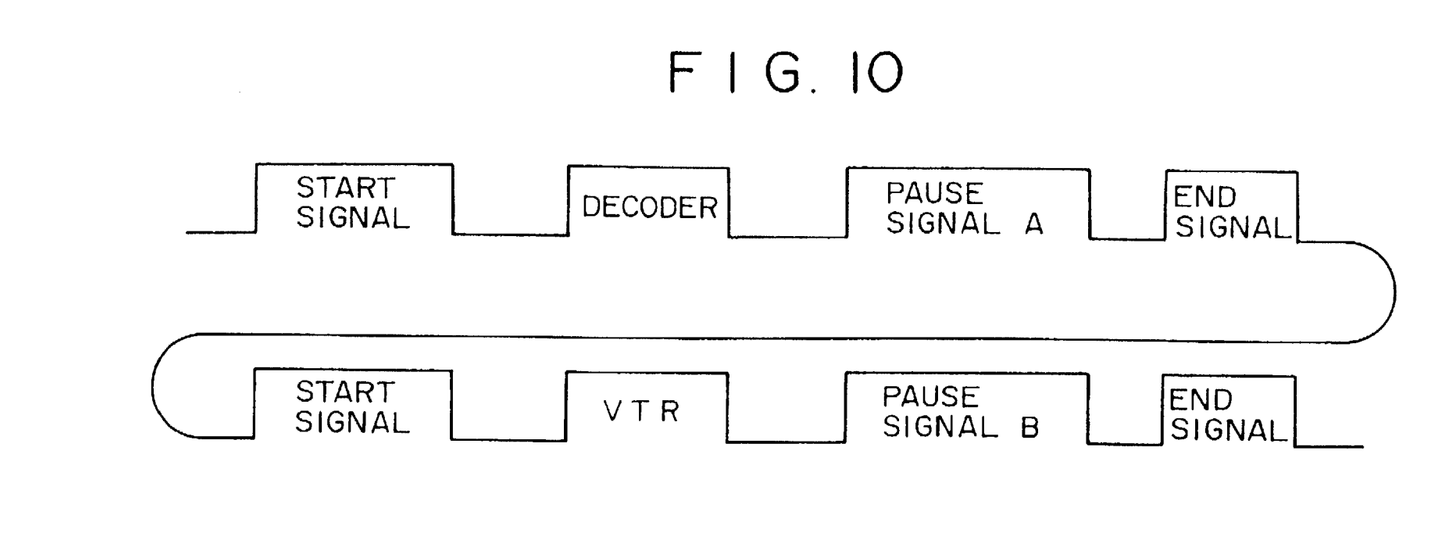
FIG. 10 is a waveform diagram illustrating an output signal when the pause button of the remote commander of FIG. 3 is manually operated while the allocation processing of FIG. 7 is performed in response to the pause button.

For example, when the pause button 45 of the remote commander 40 is manually operated, if allocation processing has been performed, then subsequently to a signal instructing a pause (a pause signal A), another signal for placing the VTR 1 into a pause condition (a pause signal B) is further outputted to the decoder 31 as seen in FIG. 10.

As a result, if the pause button 45 of the remote commander 40 is manually operated once, then not only the decoder 31 is placed into a pause condition, but also the VTR 1 is placed into a pause condition simultaneously. On the contrary if the pause button 45 is manually operated when both of the decoder 31 and the VTR 1 are already in a pause condition, then the pause condition of the decoder 31 is canceled and also the pause condition of the VTR 1 is canceled simultaneously.

Now, if the play button 13 of the remote commander 10 is manually operated, then the manual operation is detected by the key matrix 115, and a detection signal is inputted from the key matrix 115 to the CPU 111. When the detection signal is received as an input signal, the CPU 111 controls the encoder 116 so that an infrared ray signal corresponding to the manual operation of the play button 13 is outputted from the light emission section 11. When the infrared ray signal is received by the light reception section 2, the VTR 1 starts reproduction of the video tape 3 built therein.

An output video signal reproduced from the video tape 3 is inputted to the video signal processing circuit 72 by way of the external input terminal 71 of the decoder 31. The video signal processing circuit 72 processes the thus inputted video signal and outputs the thus processed signal by way of the external output terminal 73 to the monitor 51 so that it is displayed on the monitor 51.

Meanwhile, the data slicer 81 separates character codes included in the video signal inputted thereto from the external input terminal 71 and outputs the thus separated character codes to the CPU 83. The CPU 83 decodes the character codes and supplies a signal corresponding to a result of the decoding to the screen display circuit 84. The screen display circuit 84 generates character signals corresponding to the result of the decoding and stores them into the memory 85.

Figure 11:
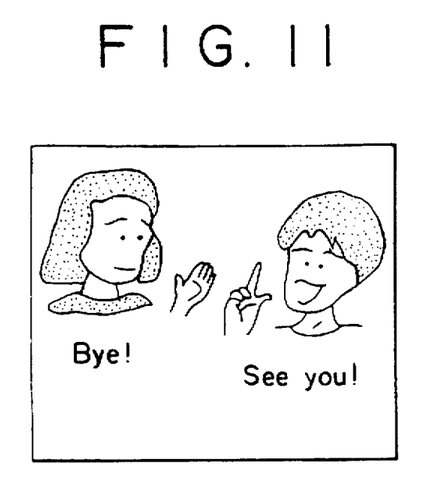
FIG. 11 is a schematic view showing an example of a display of a monitor shown in FIG. 1 in a bottom mode.

Then, the character signals stored in the memory 85 are read out at predetermined timings in synchronism with a vertical synchronizing signal and a horizontal synchronizing signal supplied from the video signal processing circuit 72 to the screen display circuit 84, and are outputted to the video signal processing circuit 72. The video signal processing circuit 72 composes the character signals with the image signal and outputs the thus composed signal to the monitor 51 by way of the external output terminal 73. Consequently, for example, such an image as shown in FIG. 11 is displayed on the monitor 51. In the example shown, the characters "Bye! See you!" are displayed in place of an image of a person.

The display condition of FIG. 11 is a display condition when a bottom mode is set by means of the position button 43. If the position button 43 is manually operated while the bottom mode is set, this is detected by the key matrix 95, and a corresponding detection signal is inputted to the CPU 91. In response to the detection signal, the CPU 91 controls the light emission section 41 by way of the encoder 96 so that a signal corresponding to the manual operation of the position button 43 is outputted from the light emission section 41.

Figure 12:
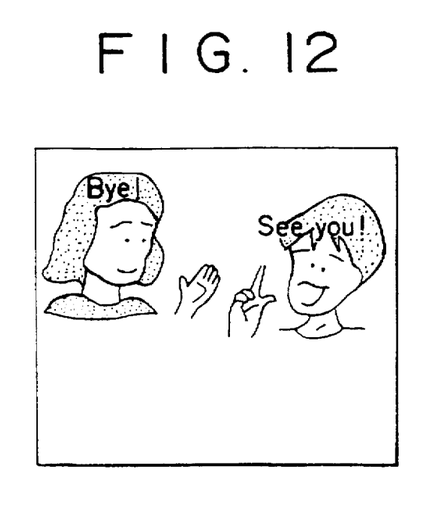
FIG. 12 is a similar view to FIG. 11 but showing an example of a display of the monitor shown in FIG. 1 in a top mode.

The CPU 83 of the decoder 31 controls, when it receives the signal by way of the light reception section 32, the screen display circuit 84 to set a top mode so that the display position of the characters is moved upwardly as seen, for example, in FIG. 12.

In the present example, the English characters "Bye! See you!" are displayed at an upper portion of the screen while Japanese characters " じゃあ/またね/・ " are displayed at a lower portion of the screen.

If the position button 43 is manually operated further in the top mode, then the CPU 83 controls the screen display circuit 84 to set a normal mode. In this instance, the screen display circuit 84 causes the characters to be displayed at a position designated by a signal included in the video signal, for example, as seen in FIG. 13.

Figure 13:
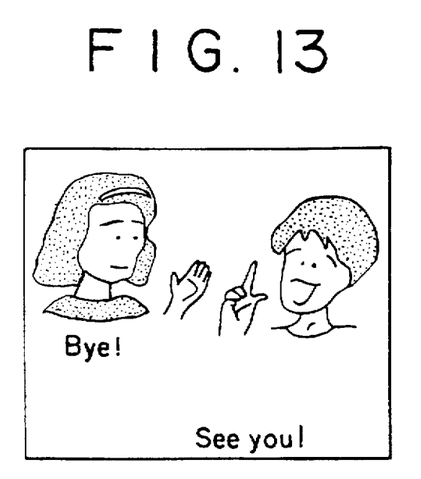
FIG. 13 is a similar view to FIG. 11 but showing an example of a display of the monitor shown in FIG. 1 in a normal mode.

On the other hand, if the display button 44 is manually operated in a condition wherein an image and characters are displayed in a superposed relationship on the monitor 51 as seen, for example, in any of FIGS. 11 to 13, then a corresponding detection signal is inputted to the CPU 91 by way of the key matrix 95. When the signal is received as an input signal, the CPU 91 controls the light emission section 41 by way of the encoder 96 to output a signal corresponding to the manual operation of the display button 44 to the decoder 31.

The CPU 83 of the decoder 31 controls, when the signal is received as an input thereto by way of the light reception section 32, the screen display circuit 84 to stop reading out of the character signals from the memory 85. Consequently, only the image is displayed on the screen of the monitor 51 while the characters are erased as seen, for example, in FIG. 14.

Figure 14:
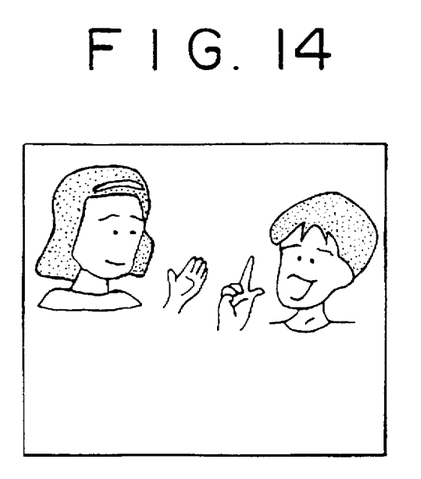
FIG. 14 is a similar view to FIG. 11 but showing an example of a display of the monitor shown in FIG. 1 when characters are erased.

In contrast, if the display button 44 is manually operated in a condition wherein only an image is displayed on the monitor 51 as seen in FIG. 14, then the condition wherein characters are displayed in a superposed condition with the image is restored as seen in any one of FIGS. 11 to 13.

Figure 15:
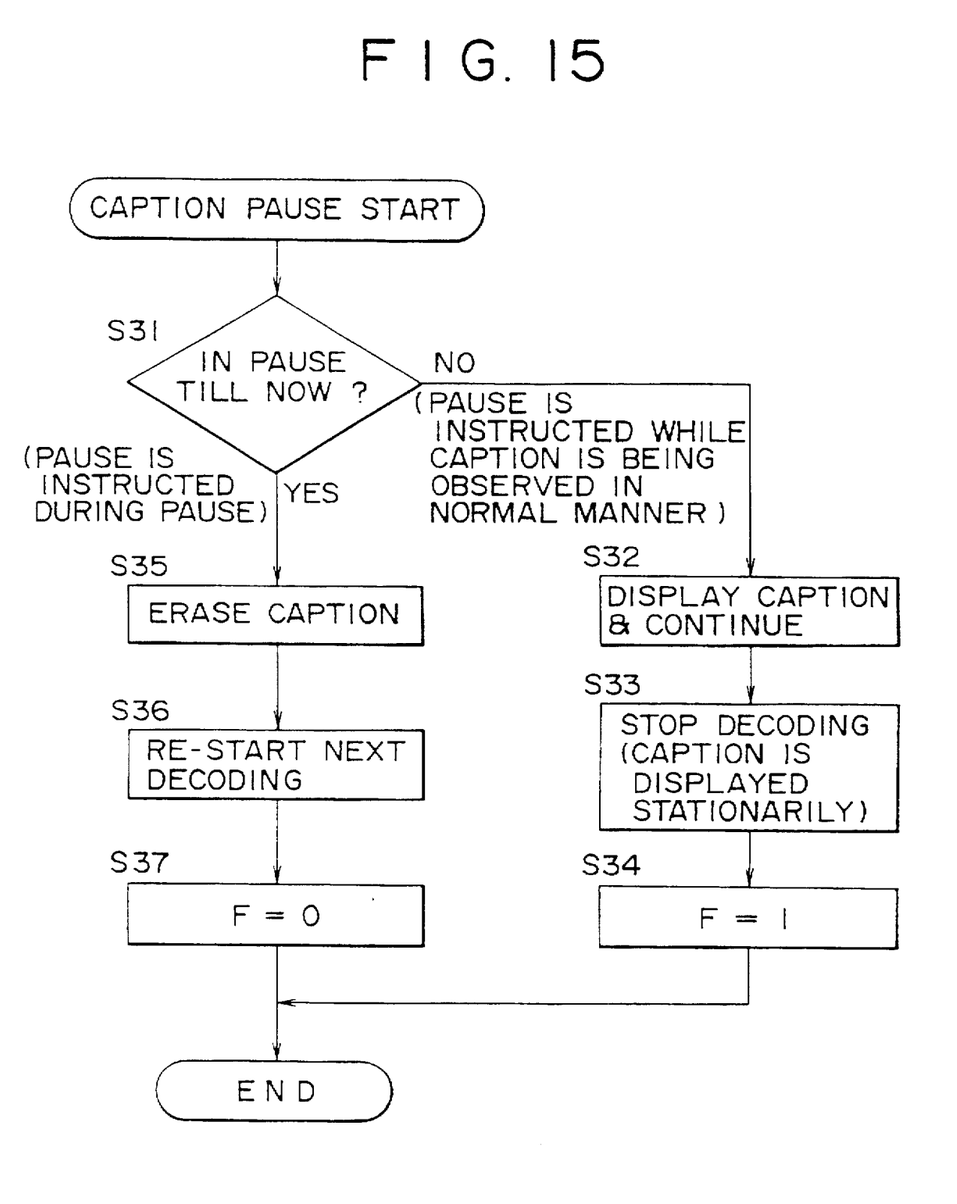

Subsequently, operation when the pause button 45 is manually operated will be described with reference to the flow chart of FIG. 15. When the pause button 45 is manually operated, a corresponding detection signal is inputted from the key matrix 95 to the CPU 91. The CPU 91 controls, when the detection signal is received as an input thereto, the light emission section 41 by way of the encoder 96 to output an infrared ray signal. When the detection signal is received by way of the light reception section 32, the CPU 83 of the decoder 31 first discriminates at step S31 whether or not the decoder 31 is in the pause condition (whether or not a flag F which indicates a pause condition is 1).

If the decoder 31 is not in a pause condition (F=0), then the control sequence advances to step S32, at which, if characters are being displayed then, the display of the characters is continued. In particular, the screen display circuit 84 repetitively executes the processing of reading out and outputting character signals stored in the memory 85. As a result of the processing, the monitor 51 remains in the condition wherein the characters are displayed in a pause condition.

Then, the control sequence advances to step S33, at which the CPU 83 executes decoding stopping processing. In particular, the CPU 83 controls the screen display circuit 84 to stop updating processing of the memory 85. Thereafter, the control sequence advances to step S34, at which "1" is placed into the flag F to set that the decoder 31 is in the pause mode at present.

On the other hand, when it is discriminated at step S31 that the decoder 31 is already in a pause condition (when it is discriminated that the flag F is 1), the control sequence advances to step S35, at which caption erasure processing is executed. In particular, the CPU 83 controls the screen display circuit 84 to end the reading out processing from the memory 85. Consequently, the characters which have been displayed on the monitor 51 till then are erased.

Thereafter, the control sequence advances to step S36, at which the next decoding processing is started. In particular, when next character codes are inputted from the data slicer 81, character signals corresponding to them are successively supplied to and stored into the memory 85 to update the memory 85. Then, the control sequence advances to step S37, at which, since the pause mode has been canceled, "0" is placed into the flag F, thereby ending the processing.

As described hereinabove, when the pause button 45 of the remote commander 40 is manually operated, if allocation processing of additional storage has been performed, then not only a pause signal is inputted to the decoder 31, but also a pause signal is inputted to the VTR 1. Accordingly, when the decoder 31 ends its decoding processing at step S33, also the VTR 1 sets a pause condition of the video tape 3, and consequently, a video signal to be thereafter inputted to the external input terminal 71 is a video signal of the same field (or frame).

On the other hand, if the pause button 45 is manually operated in a pause mode condition, then the decoder 31 re-starts decoding processing at step S36. Also in this instance, since a pause signal is inputted to the VTR 1, the VTR 1 cancels the pause condition and re-starts ordinary reproduction of the video tape 3. Consequently, a video signal of successive different frames is inputted to the decoder 31.

Figure 16:
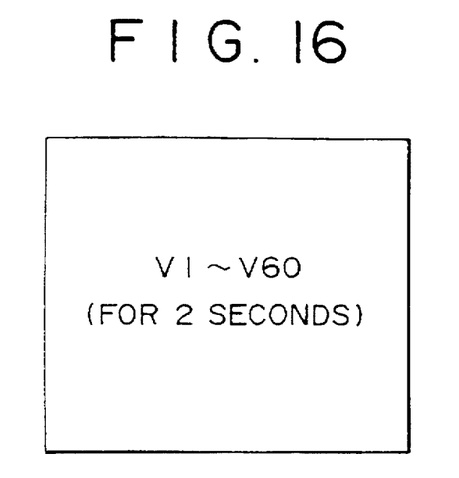
FIGS. 16 and 17 are schematic views showing different examples of a display illustrating the processing of FIG. 15.
Figure 17:
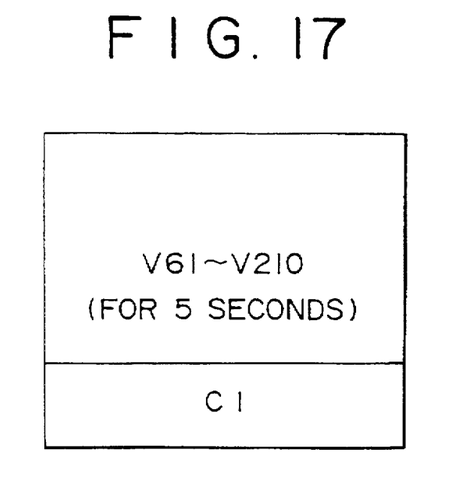
Figure 18:
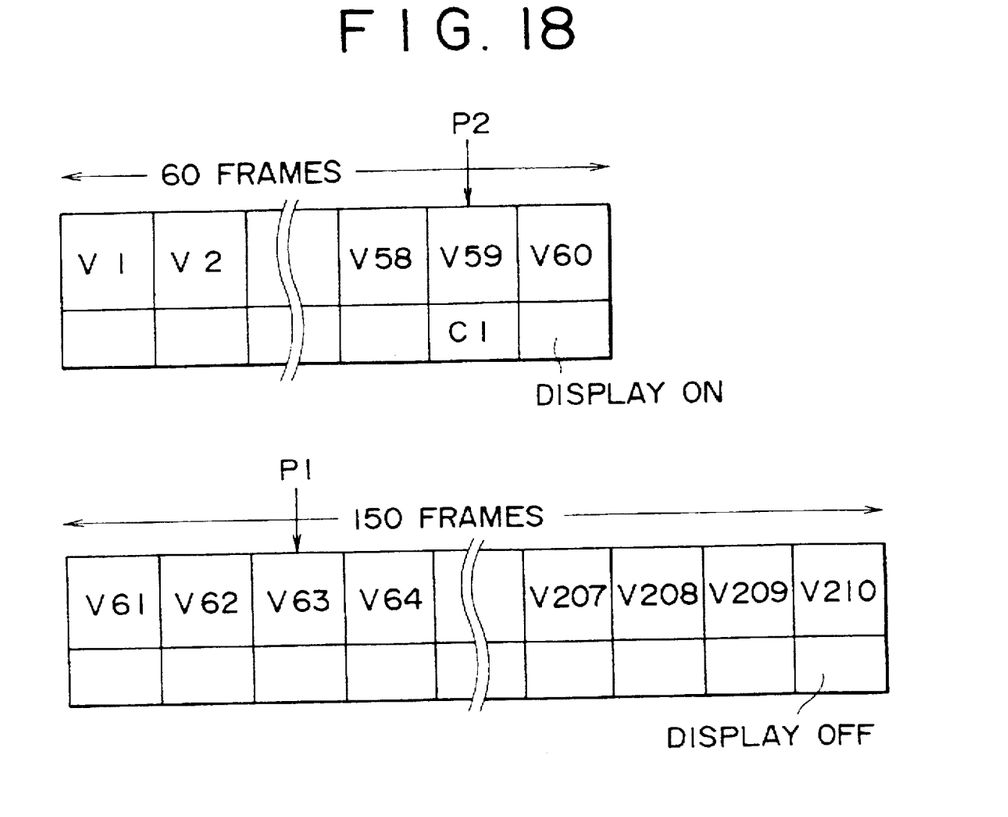
FIG. 18 is a diagrammatic view illustrating video signals for the displays illustrated in FIGS. 16 and 17.

For example, in order to display only an image for 60 frames V1 to V60 (for 2 seconds) as seen in FIG. 16 and then display a character C1 in a superposed relationship with an image for the next 150 frames V61 to V210 (for 5seconds) as seen in FIG. 17, a video signal is inputted in such a sequence as seen in FIG. 18 to the external input terminal 71.

In particular, a character code C1 is inserted in the frame V59 from among the 60 frames V1 to V60, and a display on signal for displaying the character is superposed in the next frame V60. As a result, the character C1 is displayed for the time of the next 150 frames V61 to V210 (5 seconds). This display is stopped when a display off signal inserted in the frame V210 is detected.

When such a video signal as described above is reproduced from the video tape 3 and outputted, if the pause button 45 is manually operated at the timing indicated by, for example, PI in FIG. 18, then a video signal of the frame V63 is repetitively supplied from the video tape 3 to the decoder 31. In this instance, the CPU 83 controls the screen display circuit 84 to continue reading out from the memory 85 as described above. Consequently, the character is displayed on the monitor 51 as it is. Then, since the VTR 1 is placed into a pause condition, also the image of the monitor 51 is put into a pause condition.

When the decoder 31 is placed into a pause condition, since also the VTR 1 is automatically placed into a pause condition simultaneously, such a situation that an image display (for example, a program of English conversation) proceeds forwardly while the user tries to confirm the character display is prevented. Further, since the manual operation for setting a pause is required only once, the operability is improved. Further, a detection circuit for detecting that one of the VTR 1 and the decoder 31 has been put into a pause condition need not be provided in the other of the VTR 1 and the decoder 31, and consequently, also the construction is simplified.

Further, since the decoder 31 itself is set to a pause condition, even if the time of the pause continues for more than 16 seconds, the character display can be continued as it is. This still meets the FCC specifications.

On the other hand, if the pause button 45 is manually operated at the timing indicated by P2 in FIG. 18, then a video signal of the frame V59 is repetitively supplied to the decoder 31. This frame V59 includes the character code C1. As a result, the possibility that an error may occur with the character code C1 is high. However, since the decoder 31 itself is set in a pause condition then, even if the character is displayed successively or continuously, the FCC specifications are still met.

In particular, the FCC specifications require that a character display be erased when a noise higher than a predetermined level is generated or when character data are not inputted for more than a predetermined time upon ordinary reproduction, but do not prescribe for a case in a pause condition.

While the present invention is described above by way of an example wherein a video signal recorded on a video tape is reproduced, any other recording medium may be employed such as a video disk, a compact disk, an optical disk or a magnetic disk.

Having now fully described the invention, it will be apparent to one of ordinary skill in the art that many changes and modifications can be made thereto without departing from the spirit and scope of the invention as set forth herein.

What is claimed is:

1. A character display control apparatus comprising:
   reproduction means for reproducing a video signal recorded on a recording medium and producing a video signal output, wherein character data is encoded along with a first frame of the video signal and at least one subsequent frame of the video signal is void of encoded character data;
   composition means for separating the character data from the first frame of the video signal output from said reproduction means to produce a character signal, storing the character signal, composing the character signal with an image signal in the video signal output by repeatedly reading the stored character signal synchronously with each subsequent frame, and producing a resultant composition signal; and
   signal generation means manually operated by a user of the character display control apparatus for producing a first signal to put said composition means into a pause condition, wherein the stored character signal is repeatedly read out and a second signal to put said reproduction means into a pause condition during display of the subsequent frame, whereby said composition signal comprises a still video image of the subsequent frame and said character signal from the first frame.

2. A character display control apparatus according to claim 1, wherein said signal generation means comprises a first remote commander for remotely controlling said composition means, and a second remote commander for remotely controlling said reproduction means, said first remote commander of said composition means including storage means for storing data corresponding to a signal output from said second remote commander of said reproduction means for placing said reproduction means into a pause condition.

3. A character display control apparatus according to claim 2, wherein said signal generation means includes a manually operable button manually operated by the user to place said composition means into the pause condition and thereafter to cancel the pause condition of said composition means, and when said manually operable button is manually operated while said composition means and said reproduction means are in the pause condition respective pause conditions thereof are cancelled.

4. A character display control apparatus according to claim 3, wherein said signal generation means further includes an addition button manually operated by the user to store into said storage means data corresponding to a concatenated signal comprising an original signal which is generated when said manually operable button is manually operated for placing said composition means into the pause condition and a second signal for placing said reproduction means into the pause condition.

5. A character display control apparatus comprising:
   means for supplying a video signal including an image signal, an audio signal and character data, said character data being encoded along with a first frame of said video signal and at least one subsequent frame of the video signal being void of encoded character data;
   a decoder for separating the character data from the first frame of the video signal, generating a character signal corresponding to the separated character data, storing the character signal, and superposing the character signal and the image signal by repeatedly reading out the stored character signal and combining the character signal with the first and each subsequent frame;
   means for displaying the superposed character signal and image signal; and
   manually operable means for controlling said decoder to put the character signal to be displayed into a pause condition, wherein the stored character signal is repeatedly read out and for putting said means for supplying into a pause condition during display of the subsequent frame, whereby said means for displaying displays a still video image of the subsequent frame and the character signal from the first frame.

6. A character display control apparatus according to claim 5, wherein the character data are inserted in a vertical fly-back period of the first frame of the video signal.

7. A character display control apparatus according to claim 6, wherein contents of the character data correspond to contents of the audio signal.

8. A character display control apparatus according to claim 5, wherein said manually operable means is a remote commander.

9. A character display control apparatus according to claim 8, wherein said remote commander transmits a control signal to control said decoder to put the character signal to be displayed into a pause condition and to put said supply means into a pause condition.

* * * * *